(12) United States Patent
Jeong et al.

(10) Patent No.: US 11,327,739 B2
(45) Date of Patent: May 10, 2022

(54) METHOD AND APPARATUS FOR IMPROVING RUNTIME PERFORMANCE AFTER APPLICATION UPDATE IN ELECTRONIC DEVICE

(71) Applicant: SAMSUNG ELECTRONICS CO., LTD., Suwon-si (KR)

(72) Inventors: Kwanhee Jeong, Suwon-si (KR); Sergei Lonchakov, Suwon-si (KR); Ivan Titarenko, Suwon-si (KR); Gurgen Arakelov, Suwon-si (KR); Ivan Maidanskii, Suwon-si (KR); Hyojong Kim, Suwon-si (KR); Aleksandr Semuka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/004,192

(22) Filed: Aug. 27, 2020

(65) Prior Publication Data
US 2021/0072971 A1     Mar. 11, 2021

(30) Foreign Application Priority Data
Sep. 6, 2019   (KR) .................. 10-2019-0111084

(51) Int. Cl.
*G06F 8/65* (2018.01)
*G06F 8/41* (2018.01)
*G06F 11/36* (2006.01)

(52) U.S. Cl.
CPC ............ *G06F 8/65* (2013.01); *G06F 8/427* (2013.01); *G06F 11/3612* (2013.01)

(58) Field of Classification Search
USPC ........................................................ 717/169
See application file for complete search history.

(56) References Cited

U.S. PATENT DOCUMENTS 9,207,931 B2 *   12/2015   Fox ........................... G06F 8/70
9,280,339 B1 *   3/2016   Prunicki ................... G06F 8/76
(Continued)

FOREIGN PATENT DOCUMENTS

KR   10-0828364   5/2008
KR   10-1954623   3/2019

OTHER PUBLICATIONS

Florina Muntenescu; "From Code to Dex—A Compilation Story"; Meduim.com blogsite [full url in ref.]; 2017 (Year: 2017).*
(Continued)

*Primary Examiner* — Qing Chen
*Assistant Examiner* — Clint Thatcher
(74) *Attorney, Agent, or Firm* — Nixon & Vanderhye P.C.

(57) ABSTRACT

Disclosed are a method and an apparatus for improving runtime performance when an application installed in an electronic device is updated. An electronic device according to various embodiments may include: a communication circuit configured to perform radio communication; at least one processor operatively connected to the communication circuit; and a memory operatively connected to the processor, wherein the memory stores instructions which, when executed, cause the processor to: detect updating of an application; obtain an update file for updating the application based on detecting updating of the application; obtain first information previously recorded in association with the application and second information related to the update file of the application while installing the application; and produce, based on matching performed between the first information and the second information, a new profile to be used in the application after the updating.

18 Claims, 12 Drawing Sheets

(56) References Cited

U.S. PATENT DOCUMENTS

| | | | |
|---|---|---|---|
| 10,146,522 B1* | 12/2018 | Sundresh | G06F 8/48 |
| 10,318,275 B2 | 6/2019 | Kim et al. | |
| 2003/0229890 A1* | 12/2003 | Lau | H04L 69/329 |
| | | | 717/168 |
| 2007/0294684 A1 | 12/2007 | Kumashiro et al. | |
| 2009/0144718 A1 | 6/2009 | Boggs et al. | |
| 2012/0137138 A1* | 5/2012 | Gregorovic | G06F 8/61 |
| | | | 707/694 |
| 2012/0174086 A1* | 7/2012 | Raju | G06F 9/45504 |
| | | | 717/168 |
| 2014/0033123 A1 | 1/2014 | Hockmann | |
| 2014/0122862 A1 | 5/2014 | Ludwig et al. | |
| 2014/0298307 A1 | 10/2014 | Johnson et al. | |
| 2017/0010952 A1* | 1/2017 | Nandakumar | G06F 8/30 |
| 2017/0147324 A1* | 5/2017 | Weber | G06F 8/656 |
| 2018/0032441 A1 | 2/2018 | De | |
| 2018/0189051 A1 | 7/2018 | Im et al. | |
| 2018/0373523 A1* | 12/2018 | Wei | G06F 8/71 |
| 2019/0235850 A1* | 8/2019 | Mukherjee | G06F 8/71 |

OTHER PUBLICATIONS

"What is Hash Function?"; Technopedia.com website [full url in ref.]; 2018 (Year: 2018).*

International Search Report and Written Opinion dated Nov. 26, 2020 in corresponding International Application No. PCT/KR2020/011323.

* cited by examiner

METHOD AND APPARATUS FOR IMPROVING RUNTIME PERFORMANCE AFTER APPLICATION UPDATE IN ELECTRONIC DEVICE

CROSS-REFERENCE TO RELATED APPLICATION

This application is based on and claims priority under 35 U.S.C. § 119 to Korean Patent Application No. 10-2019-0111084, filed on Sep. 6, 2019, in the Korean Intellectual Property Office, the disclosure of which is incorporated by reference herein in its entirety.

BACKGROUND

Field

The disclosure relates to a method and apparatus for improving runtime performance when an application installed in an electronic device is updated.

Description of Related Art

An electronic device may include an operating system (OS) for controlling one or more resources, and may include applications executable in the operating system. The operating system may be, for example, Android™, iOS™, Windows™, Symbian™, Tizen™, Bada™, or the like. According to an embodiment, Android™ provides a new runtime, called Android runtime (ART), in order to overcome a limitation of a Dalvik virtual machine (VM) which has been conventionally used. For example, Dalvik VM uses a just-in-time (JIT) compile scheme, and the initial ART uses an ahead-of-time (AOT) compile scheme. However, due to a limitation that each scheme has, a hybrid scheme of the JIT compile scheme and the AOT compile scheme has been used recently. For example, the AOT compile scheme requires a large amount of compiling time when installing an application, and may additionally request a storage space for storing a product (e.g., *.odex, *.vdex, *.art) obtained via compiling. For example, the JIT compile scheme may perform compiling based on a native code during a runtime, thereby requiring a small amount of time for installation. However, if repetition is detected when a memory in which the data is cached is released, reconversion is needed and a delay occurs in operating an application by the time corresponding to the amount of time spent on reconversion, and thus, it may take a long time to perform JIT compiling.

Conversely, the hybrid scheme may be the scheme of using both schemes in order to strengthen the strengths of JIT and AOT. For example, a scheme may be applied, that reduces an installation time and the capacity for storage using JIT when initially installing an application, and that directly uses a corresponding compiled code according to ART when operating the application.

The electronic device may periodically perform application updating with respect to applications installed in the electronic device via various application stores (hereinafter, referred to as an "app store") (e.g., Play store™). According to an embodiment, if a profile of an application is updated, the electronic device may collect the updated profile, and may transfer the same to an app store (or a cloud server). The app store may produce a common profile appropriate for the corresponding application, based on the profile (or information) received from the electronic device. In the case of application updating, the app store may transfer, to the electronic device, an update file (e.g., an installation file (e.g., *.apk file) and the common profile (e.g., *.dm file) of the application, together. The electronic device may perform AOT compiling based on the update file and the common profile of the application, transferred from the app store, and may store a native code as a file.

If the electronic device (or an operating system) (e.g., Android™) stores the profile of the application via the app store, the electronic device may perform AOT compiling based on the stored profile, and may store a native code as a file. The profile stored in the electronic device may be information produced when the updated application version is used by many users and the information associated therewith are collected by the app store. Therefore, if the electronic device does not have a related profile in association with a newly updated application version or an application of which data is insufficiently collected, the app store may not transfer a corresponding profile together with the application when the electronic device transmits a request for downloading the application. Also, since the app store provides a profile produced based on information from various different users, as opposed to information from a user who uses the electronic device, the profile provided via the app store may not be accurately identical to a user pattern.

Generally, in the case of application updating, the electronic device may delete (or remove) a profile and a native code, which were produced according to the user pattern when the application before updating was used. Therefore, since the profile and the native code, produced according to the user pattern associated with the application are deleted, the electronic device may lose data associated with previous user experience, after application updating. The usage history associated with the corresponding application is not present, and thus, runtime performance deteriorates. Also, a user needs to wait during the time required for sufficient profiling and producing of a native code, in order to secure the performance that is equal to the previous performance. In this instance, the time is not a standardized time, and may vary depending on a method that each user uses. Therefore, when updating a new application, the user may be inconvenienced due to performance worse than before.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a method and apparatus for improving runtime performance utilizing a previous profile and a bytecode, when an electronic device performs application updating.

Embodiments of the disclosure provide a method and apparatus for improving runtime performance by utilizing a profile and a bytecode which are previously stored (or produced) based on a user's application usage pattern, when the electronic device performs application updating, for example, in the Android runtime (ART) environment.

Embodiments of the disclosure provide a method and apparatus for maintaining an existing profile, produced according to a user's usage pattern, irrespective of existence of a common profile (e.g., *.dm file) of an application delivered from an app store, and for processing application updating using the existing profile.

Embodiments of the disclosure provide a method and apparatus for maintaining a profile produced based on a user pattern, as it is, if a profile is not transferred from an app store, together with an application in the process of downloading the application, and for identifying whether the profile is used using a subsequently produced product.

In accordance with an example embodiment of the disclosure, an electronic device includes: a communication circuit configured to provide radio communication; at least one processor operatively connected to the communication circuit; and a memory operatively connected to the processor, wherein the memory stores instructions which, when executed, cause the processor to: detect updating of an application; obtain an update file for updating the application based on detecting updating of the application; obtain first information previously recorded in association with the application and second information related to the update file of the application while installing the application; and produce, based on matching performed between the first information and the second information, a new profile to be used in the application after the updating.

In accordance with an example embodiment of the disclosure, an operation method of an electronic device may include: detecting updating of an application; obtaining an update file for updating the application based on detecting updating of the application; obtaining first information previously recorded in association with the application and second information related to the update file of the application while installing the application; and producing, based on matching performed between the first information and the second information, a new profile to be used in the application after the updating.

To address the above described problems, various example embodiments of the disclosure may include a non-transitory computer-readable recording medium that stores a program for implementing the method in a processor.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

In electronic device and an operation method thereof according to various embodiments, when the electronic device performs application updating, the electronic device may use a previous profile and a bytecode which are previously stored based on a user's usage pattern associated with an application, and may improve runtime performance. According to various embodiments, the electronic device may maintain a previous profile, produced according to a user's usage pattern, irrespective of existence of a common profile (e.g., *.dm file) of an application delivered from an app store, and may process application updating using the previous profile. According to various embodiments, the electronic device may compare an execution file of an application to be updated, with a previous profile and an execution file (e.g., dex file) in an installation file of a previous application, and may maintain existing information for a method and class having no change. According to various embodiments, the electronic device may produce a new profile associated with an application, based on existing information, and may use the newly produced profile information of the application when performing application updating. According to various embodiments, the electronic device may produce a native code for a hot method, based on newly produced profile and may produce an application image file (e.g., *.art) associated with a hot class, so as to provide a user with prompt runtime performance, which is faster than before. According to various embodiments, after application updating is performed, the electronic device may provide a user experience that enables a user to immediately use an application with runtime performance applied according to a pattern that a user previously uses, although the electronic device additionally uses the updated application.

Figure 1:
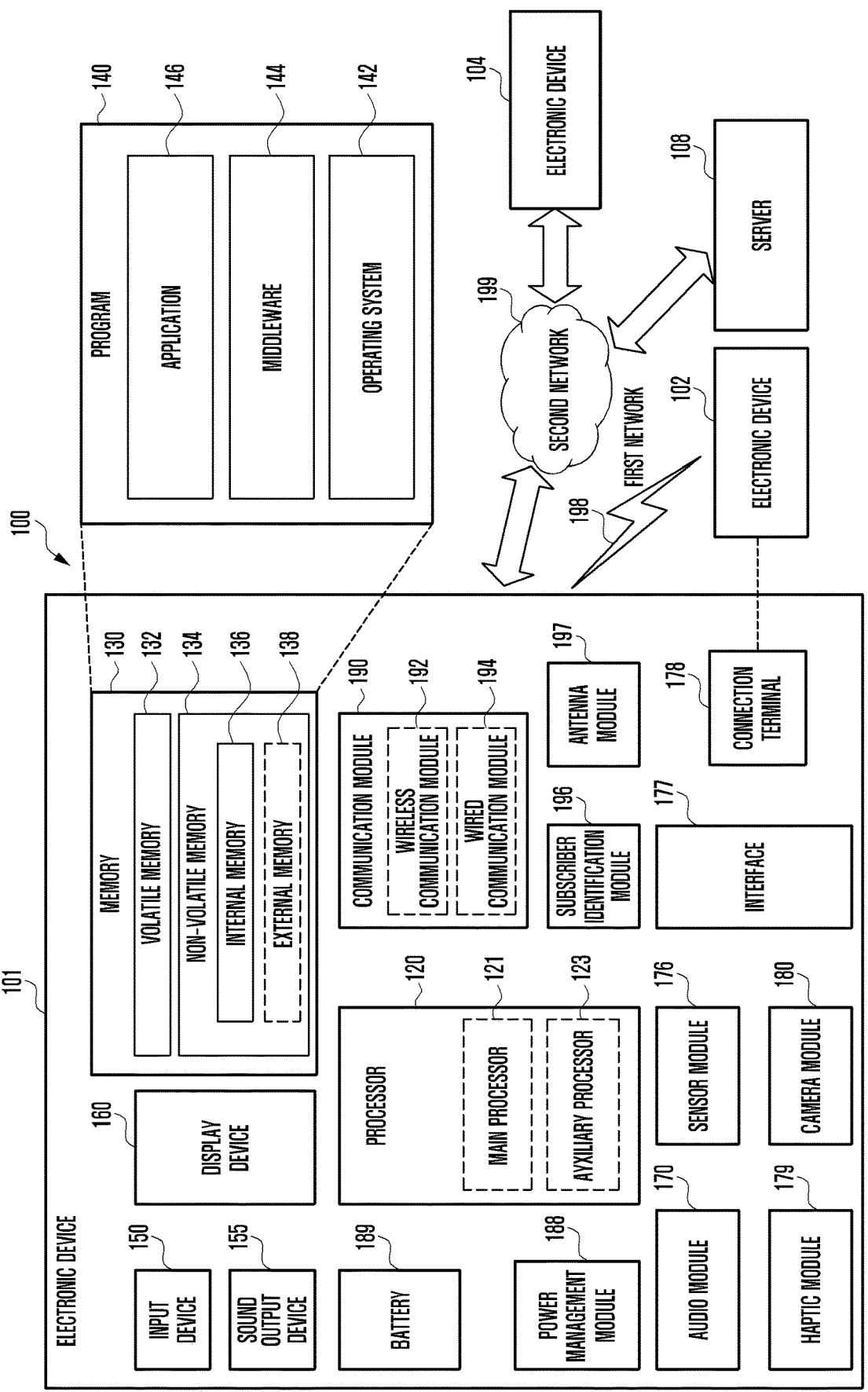
FIG. 1 illustrates an example electronic device in a network environment according to an embodiment.

FIG. 1 illustrates an example electronic device 101 in a network environment 100 according to an embodiment of the disclosure. Referring to FIG. 1, the electronic device 101 in the network environment 100 may communicate with an electronic device 102 via a first network 198 (e.g., a short-range wireless communication network), with an electronic device 104 or a server 108 via a second network 199 (e.g., a long-range wireless communication network), or with the electronic device 104 via the server 108, and may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in the volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101 and may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146. The input device 150 may receive a command or data to be used by another component (e.g., the processor 120) of the electronic device 101, from the outside (e.g., a user) of the electronic device 101, and may include a microphone, a mouse, a keyboard, or a digital pen (e.g., a stylus pen).

The sound output device 155 may output sound signals to the outside of the electronic device 101 and may include a speaker or a receiver. The speaker may be used for general purposes, such as playing multimedia or playing record, and the receiver may be used for incoming calls and may be implemented as separate from, or as part of the speaker.

The display device 160 may visually provide information to the outside (e.g., a user) of the electronic device 101 and may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa, and may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), and may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, image signal processors, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 (e.g., a transceiver) may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 and may include an antenna including a radiating element including a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., a radio-frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. To that end, a cloud, distributed, or client-server computing technology may be used, for example. The electronic device 101 according to embodiments may be one of various types of electronic devices, such as, for example, and without limitation, a portable communication device (e.g., a smartphone), a computer device, a portable multimedia device, a portable medical device, a camera, a wearable device, a home appliance, or the like. However, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., over wires), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
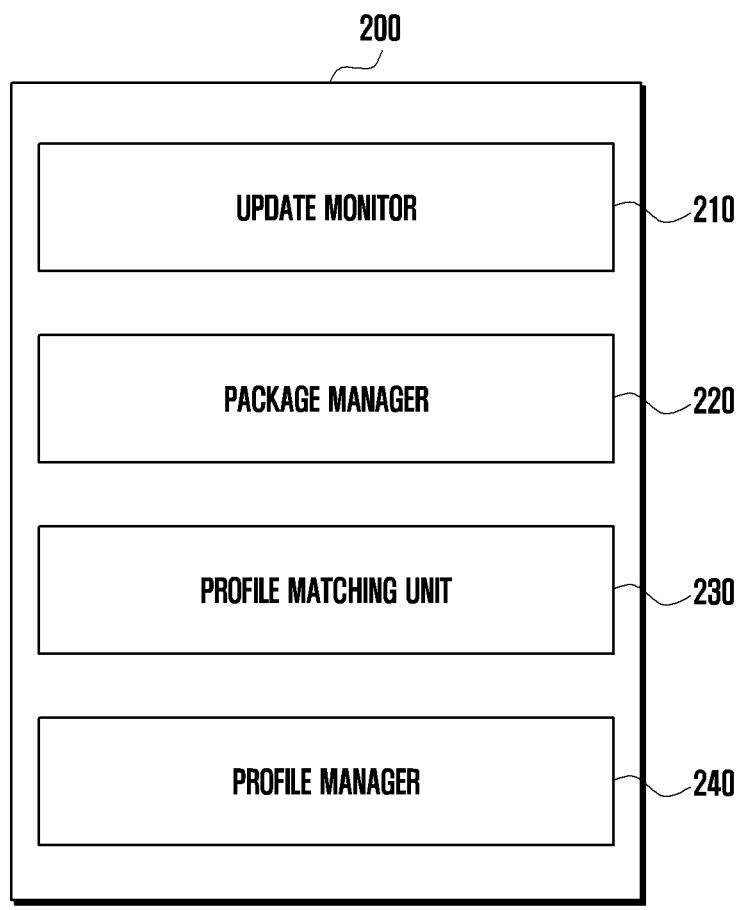
FIG. 2 is a diagram illustrating an example functional module of an electronic device according to various embodiments.

FIG. 2 is a diagram illustrating an example functional module of an electronic device according to various embodiments.

As illustrated in FIG. 2, FIG. 2 illustrates an example of an functional module 200 that executes (or processes) a function related to updating of an application of an electronic device in various embodiments. According to various embodiments, the functional module 200 may be implemented as a hardware module and/or a software module, contained in at least one processor (e.g., the processor 120 of FIG. 1) including a processing circuitry. According to an embodiment, the functional module 200 of FIG. 2 may operate as a part of the processor 120, and/or may be a separate hardware component operating independently from the processor 120. According to an embodiment, the functional module 200 of FIG. 2 may be software (e.g., the program 140 of FIG. 1). For example, the functional module 200 in the form of software may be stored in the form of commands (or instructions) in a memory (e.g., the memory 130 of FIG. 1), and operations of the functional module 200 may be executed by at least one processor (e.g., the processor 120 of FIG. 1).

Referring to FIG. 2, the functional module 200 may include at least one of an update monitor (e.g., including processing circuitry and/or executable program elements) 210, a package manager (e.g., including processing circuitry and/or executable program elements) 220, a profile matching unit (e.g., including processing circuitry and/or executable program elements) 230, and/or a profile manager (e.g., including processing circuitry and/or executable program elements) 240.

According to an embodiment, the update monitor 210 may monitor whether updating is performed on an application installed in the electronic device 101. According to an embodiment, the update monitor 210 may detect updating (e.g., including application installation) of at least one application, based at least on an app store or other methods (e.g., installation performed based on an Android debug bridge (ADB) command). According to an embodiment, the update monitor 210 may receive (or download) an update file (e.g., an installation file (e.g., Android application package (apk) file)) from an app store, via a communication circuit (e.g., the radio communication module 192 of FIG. 1), based on the detection of application updating. According to an embodiment, an application (e.g., Android application) may be developed using a predetermined programming language (e.g., Java language), and a resource file (e.g., a Java source code, a layout xml file, an image file, an audio file, animation, a menu, a style, and/or a color) may be produced as an update file (e.g., apk file) using a software development kit (SDK). An update file may be an Android package, and the extension thereof is ".apk". For example, a single apk file may be a single application (or app), and may be a file to be installed in the electronic device 101.

According to an embodiment, the package manager 220 may verify an application. According to an embodiment, the package manager 220 may check the validity of an update file (e.g., an update file related to an application which is to be updated) received via the update monitor 210. According to an embodiment, the package manager 220 may perform verification based on vending, and/or may perform verification based on device security. According to an embodiment, if verification on an application is complete, the package manager 220 may transfer a request for application updating to the profile matching unit 230. According to an embodiment, the package manager 220 may transfer the application updating request to an Android runtime (ART). In the process of installing an application, the application updating request is transferred to the profile matching unit 230, before being transferred to a runtime (e.g., Android runtime (ART)).

According to an embodiment, the profile matching unit 230 may perform matching of a current update file (e.g., an update file received (or downloaded) from an app store in association with application updating), against a previous profile (e.g., *.prof file) recorded (or stored) according to a user pattern associated with a user's application usage and a bytecode (e.g., an execution file of an application (e.g., dex information)) in a previous update file (e.g., previous *.apk file). According to an embodiment, the profile matching unit 230 may compare the current update file related to the target application, with the previous profile recorded (or stored) according to a user's usage pattern associated with the application and an execution file (e.g., dex information) in the previous update file of the application before application updating is requested from a runtime (e.g., ART). According to an embodiment, the profile matching unit 230 may maintain existing information for a method and/or class having no change, may add new information for a new method and/or class, and may perform matching between the existing information and the new information. For example, the profile matching unit 230 may produce a new update file (e.g., new*.apk file) related to the target application, via matching.

According to an embodiment, in the process of installation based on application updating, the profile matching unit 220 may produce a new profile for application updating based on the previous profile using a profile quick reuse tool (hereinafter referred to as "profile reuse tool"), and may transfer the new profile to a runtime (e.g., ART). According to an embodiment, the runtime may, as before, compile the new profile transferred from the profile matching unit 220, and may produce a native code (e.g.,*.odex and/or *.oat) and an initialization image (e.g., *.art) associated with class information of the application. According to an embodiment, a native code, for example, may be a compiled bytecode, and may include a compiled machine code.

According to an embodiment, as one of the methods of providing a new profile to a user, the profile matching unit 220 may produce a temporary profile using the bytecode (e.g., dex information) of the previous update file (e.g., *.apk) and the previous profile (e.g., *.prof file) collected based on a user's application usage pattern. According to an embodiment, the profile matching unit 220 may produce, based on the temporary profile, a new profile to be used in the application that is to be updated. For example, the profile matching unit 220 may obtain (parse or extract) the previous profile and the bytecode in the previous update file. For example, the profile matching unit 220 may produce first class metadata using the bytecode (e.g., dex information) included in the previous update file and the previous profile collected based on the user's usage pattern. According to an embodiment, the profile matching unit 220 may extract a frequently used hot method and codebase information of the hot method, based on the previous profile and the dex information of the previous update file, and may analyze and parse the codebase information based on a command code (e.g., opcode, operation code) and an argument object (e.g., args). According to an embodiment, the processor 120 may produce first class metadata associated with a class used for accessing the application and a hot method, based on the parsed information.

According to an embodiment, the profile matching unit 220 may obtain (parse or extract) the bytecode (e.g., dex information) in the current update file (e.g., downloaded update file) related to the application to be updated. For example, the profile matching unit 220 may produce second class metadata using the dex information of the current update file. According to an embodiment, the profile matching unit 220 may produce the second class metadata in response to the operation of producing the first class metadata.

According to an embodiment, the profile matching unit 220 may perform update file matching by comparing the first class metadata produced based on the previous information (e.g., the previous profile and the dex information of the previous update file) and the second class metadata produced based on the current information (e.g., the dex information of the current update file). According to an embodiment, before application updating is requested from a runtime, the profile matching unit 220 may compare the dex information in the current update file related to the application with the previous profile recorded (or stored) according to a user's usage pattern associated with the target application and the dex information in the previous update file of the application, may maintain existing information for a method and/or class having no change, may add new information for a new method and/or class, and may perform matching between the existing information and new information. For example, the profile matching unit 220 may identify an identical portion by comparing the first class metadata and the second class metadata. According to an embodiment, the profile matching unit 220 may maintain existing information for a method and a class having no change, based on the comparison between the first class metadata and the second class metadata, and may include the existing information in a new profile.

According to various embodiments, the previous information (e.g., the previous profile and the dex information of the previous update file) may be stored in, and may be synchronized with an external server, via interoperation with the external server. According to an embodiment, the previous information may be contained (or stored) in and may be synchronized with an external server (e.g., cloud) that stores personalized information. According to an embodiment, if a user of the electronic device 101 uses another new electronic device, the user may utilize previous information contained in an external server when initially executing (driving) an application.

According to an embodiment, the profile matching unit 220 may produce a new profile based on class metadata matching. For example, the profile matching unit 220 may produce a new update file (e.g., a new installation file (e.g., new *.apk file)) related to an application, via matching, and may parse an execution file (e.g., dex information) from the new update file so as to produce a new profile to be actually used for compiling.

According to an embodiment, the profile manager 240 may perform compiling based on a new profile. According to an embodiment, the profile manager 240 may request compiling from a runtime (e.g., ART) in order to perform application updating based on the new profile transferred from the profile matching unit 230, and may enable the runtime to perform compiling based on the new profile. According to an embodiment, the profile manager 240 may produce a product based on a result obtained by performing compiling. According to an embodiment, the product may include a native file (or code) such as *.odex, *.vdex, or *.oat, and an initialization image associated with application class information such as *.art. For example, the profile manager 240 may produce *.oat file (or a native file) in which dex information is complied and may produce *.art (or an initialization image). According to an embodiment, if a product is successfully produced based on the result obtained by performing compiling, the profile manager 240 may delete the directory of a previous application.

According to various embodiments, the produced product may be stored and managed via interoperation with an external server. According to an embodiment, the produced product may be contained (or stored) in, and synchronized with, an external server (e.g., cloud) that stores personalized information. According to an embodiment, if a user of the electronic device 101 uses another new electronic device, the user may utilize the product contained in an external server when initially executing (driving) an application.

According to various example embodiments, the electronic device 101 may include: a communication circuit (e.g., the radio communication module 192 of FIG. 1) configured to provide radio communication; at least one processor (e.g., the processor 120 of FIG. 1) operatively connected to the communication circuit; and a memory (e.g., the memory 130 of FIG. 1) operatively connected to the processor, wherein the memory may store instructions which, when executed, cause the processor to: detect updating of an application; obtain an update file for updating the application based on detecting updating of the application; obtain first information previously recorded in association with the application and second information related to the update file of the application while installing the application; and produce, based on matching performed between the first information and the second information, a new profile to be used in the application after the updating.

According to various example embodiments, the first information (e.g., previous profile information and dex information of the previous update file) may be stored in, and synchronized with, an embedded memory (e.g., the memory 130 of FIG. 1) of the electronic device and/or an external server.

According to various example embodiments, the first information may include first metadata produced based on a previous profile recorded based on a usage pattern associated with the application, and a bytecode of a previous update file of the application.

According to various example embodiments, the second information may include second metadata produced based on a bytecode of the update file obtained from an app store using the communication circuit at a point in time at which the application is updated.

According to various example embodiments, the instructions, when executed, may cause the processor to verify the update file of the application.

According to various example embodiments, the instructions, when executed, may cause the processor to: perform matching between the first information and the second information before updating of the application is requested from a runtime; and maintain an identical method and an identical class based on the matching.

According to various example embodiments, the instructions, when executed, may cause the processor to: parse the previous profile and the bytecode included in the previous update file in association the first information to produce first metadata; parse the bytecode included in the update file associated with the second information to produce second metadata; and compare the first metadata and the second metadata.

According to various example embodiments, the first metadata and the second metadata may include at least one of class information, a method return type, a method argument, and a method command.

According to various example embodiments, the instructions, when executed, may cause the processor to perform the comparison based on hash values of the first metadata and the second metadata.

According to various example embodiments, the instructions, when executed, may cause the processor to perform compiling based on the new profile produced based on matching performed between the first information and the second information.

According to various example embodiments, the instructions, when executed, may cause the processor to produce a native code and an initialization image associated with application class information based on the compiling of the new profile.

Hereinafter, an example operation method of the electronic device 101 according to various embodiments will be described in greater detail. According to various embodiments, the operations, which are performed by the electronic device 101 and are described below, may be performed by at least one processor (e.g., the processor 120 of FIG. 1) (hereinafter, referred to as "processor 120") including a processing circuitry of the electronic device 101. According to an embodiment, the operations performed by the electronic device 101 may be stored in a memory (e.g., the memory 130 of FIG. 1) (hereinafter, referred to as "memory 130"), and may be executed according to instructions configured to enable the processor 120 to perform operation when the instructions are executed.

Figure 3:
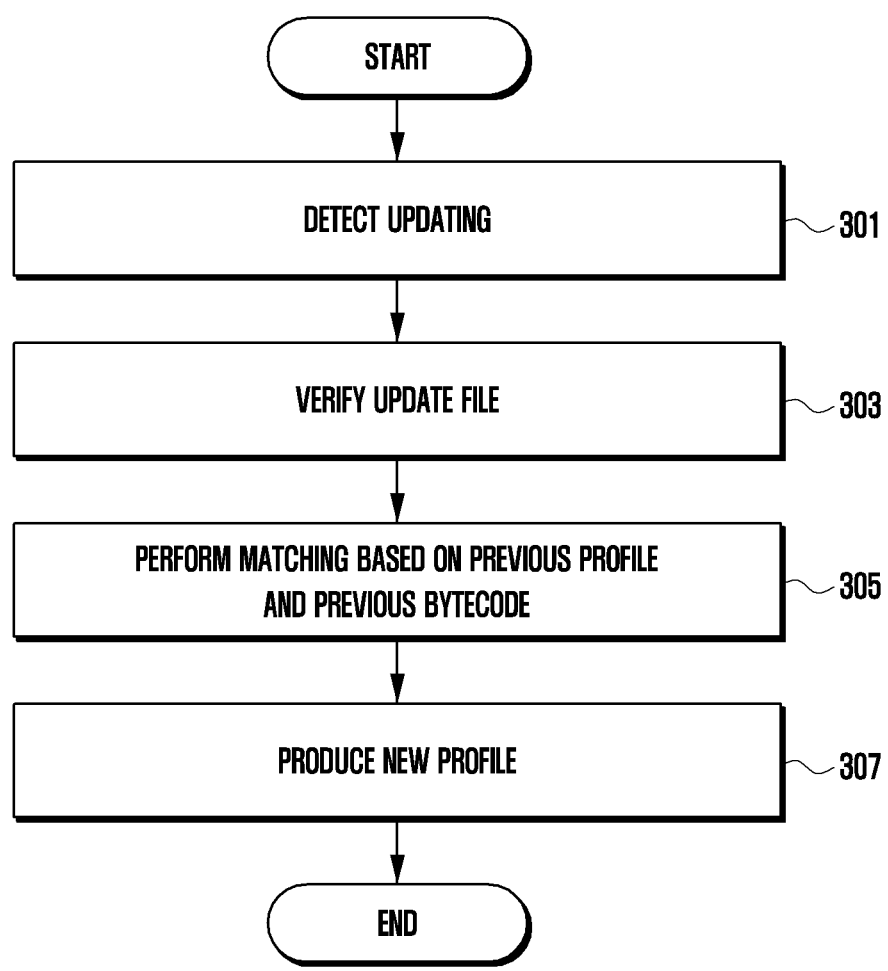
FIG. 3 is a flowchart illustrating an example method of operating an electronic device according to various embodiments.

FIG. 3 is a flowchart illustrating an example method of operating an electronic device according to various embodiments.

Referring to FIG. 3, in operation 301, the processor 120 of the electronic device 101 may detect updating of an application. According to an embodiment, the processor 120 may detect updating of at least one application (e.g., including application installation), based at least on an app store or other methods (e.g., installation performed based on an ADB command). According to an embodiment, the processor 120 may receive (or download) an update file (e.g., an installation file (e.g., apk file)) from an app store, via a communication circuit (e.g., the radio communication module 192 of FIG. 1), based on the detection of application updating.

In operation 303, the processor 120 may verify the corresponding application, based on the detection of application updating. According to an embodiment, the processor 120 may check the validity of a current update file (or an application installation file (e.g., apk file)) related to the application to be updated. For example, the processor 120 may perform verification based on vending and/or may perform verification based on device security.

In operation 305, when the verification of the corresponding application is complete, the processor 120 may perform matching of the current update file (e.g., an update file received (or downloaded) from an app store in association with application updating), against a previous profile (e.g., *.prof file) and a bytecode (e.g., an execution file of an application (e.g., dex information)) in a previous update file (e.g., previous *.apk file). According to an embodiment, the processor 120 may compare the current update file related to the application to be updated with the previous profile recorded (or stored) according to a user's application usage pattern and the execution file (e.g., dex information) in the previous update file of the application, before application updating is requested from a runtime (e.g., ART). According to an embodiment, the processor 120 may maintain existing information for a method and/or class having no change, may add new information for a new method and/or class, and may perform matching between the existing information and the new information. For example, the processor 120 may produce a new update file (e.g., new *.apk file) related to the target application, via matching. According to various embodiments, the operation of performing update file matching will be described with reference to drawings.

In operation 307, the processor 120 may produce a new profile to be used for the target application. According to an embodiment, the processor 120 may produce the new profile to be actually used for compiling, based on the current update file (e.g., the bytecode (e.g., dex information) of a new installation file (e.g., new *.apk file)). According to various embodiments, the operation of producing the new profile will be described with reference to drawings.

Figure 4:
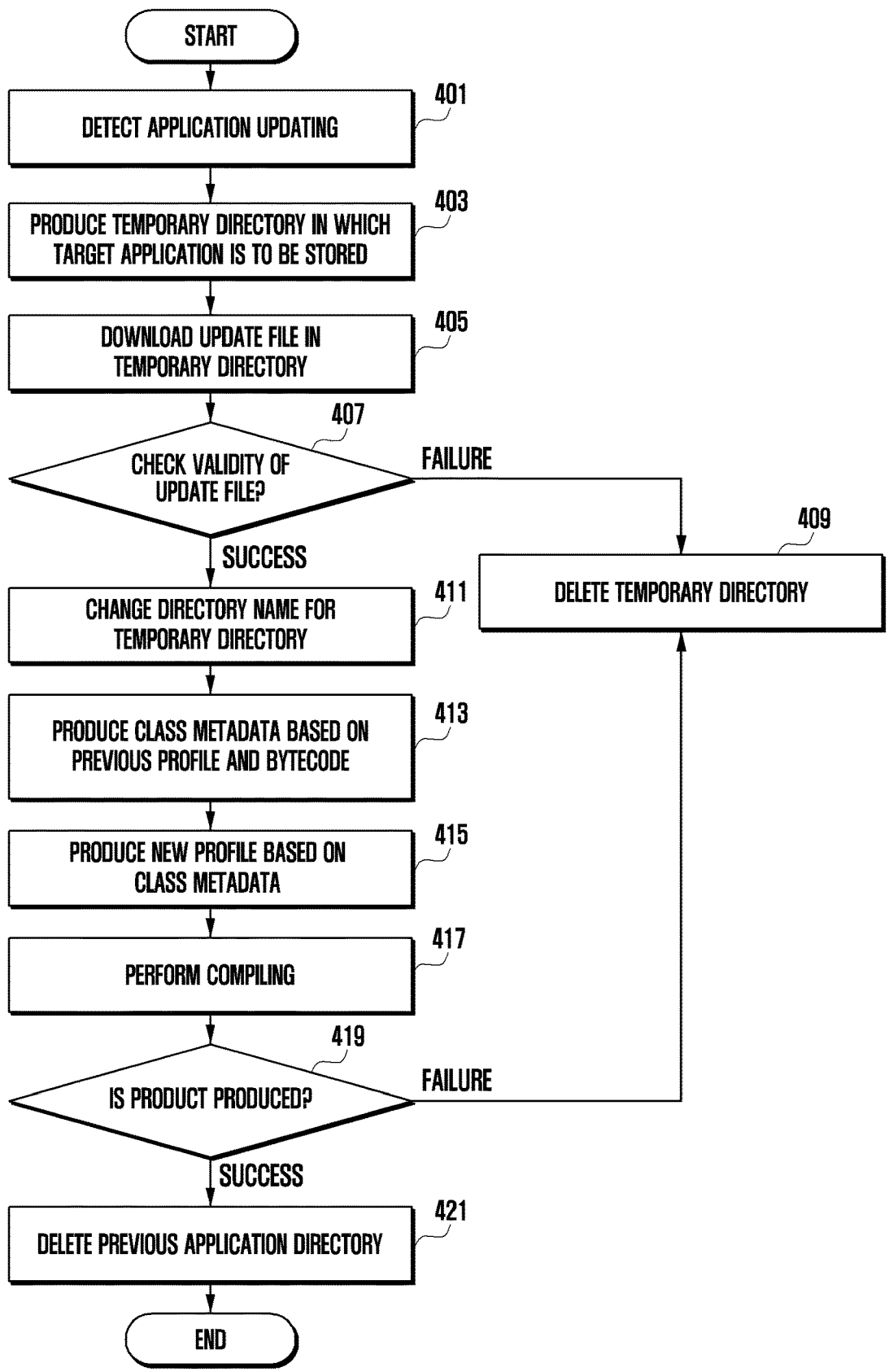
FIG. 4 is a flowchart illustrating an example method of operating an electronic device according to various embodiments.

FIG. 4 is a flowchart illustrating an example method of operating an electronic device according to various embodiments.

According to an embodiment, FIG. 4 illustrates an example of an operation in which the electronic device 101 updates an application, based on improvement of runtime performance.

Referring to FIG. 4, in operation 401, the processor 120 of the electronic device 101 may detect updating of an application. According to an embodiment, the processor 120 may detect updating (e.g., including application installation) of at least one application, based at least on an app store or other methods (e.g., installation performed based on an ADB command).

In operation 403, the processor 120 may produce a temporary (temp) directory (or folder) in which an application to be updated is to be stored, based on the detection of application updating. According to an embodiment, the processor 120 may produce a temporary directory in which an update file (or installation file (e.g., *.apk file)) related to the target application is to be stored. According to an embodiment, when producing a temporary directory, the processor 120 may arbitrarily (or randomly) produce the directory name of the temporary directory, and may set the produced directory name as the directory name of the temporary directory.

In operation 405, the processor 120 may download an update file in the temporary directory.

In operation 407, the processor 120 may verify the downloaded update file. According to an embodiment, the processor 120 may check the validity of the update file (e.g., apk file) related to the target application. For example, the processor 120 may perform verification based on vending and/or may perform verification based on device security.

If the processor 120 determines that the update file is invalid (e.g., fails to verify the update file) (e.g., "failure" in operation 407) based on the result of validity check of the update file, in operation 407, the processor 120 may delete the temporary directory in operation 409. According to an embodiment, when deleting the temporary directory, the processor 120 may also delete (or remove) the downloaded update file.

If the processor 120 determines that the update file is valid (e.g., successfully verify the update file) (e.g., "success" in operation 407) based on the result of a validity check of the update file, in operation 407, the processor 120 may change the directory name of the temporary directory in operation 411. According to an embodiment, the processor 120 may change the directory name set for the temporary directory to a name associated with the target application (e.g., an application name). For example, the processor 120 may produce the temporary directory as an actual directory of the application to be updated.

In operation 413, the processor 120 may produce class metadata based on a previous profile and a bytecode. According to an embodiment, the processor 120 may produce first class metadata based on the previous profile (e.g., *.prof file) and a bytecode (e.g., dex information) in a previous update file (e.g., previous *.apk file) related to the application. According to an embodiment, the processor 120 may produce second class metadata based on a bytecode (e.g., dex information) in a current update file (e.g., new *.apk file) related to the application. According to an embodiment, the previous profile (e.g., *.prof file) and the previous update file (e.g., previous *.apk file) related to the application may be stored in, and may be synchronized with, an embedded memory (e.g., the memory 130 of FIG. 1) of the electronic device 101, and/or an external server.

In operation 415, the processor 120 may produce a new profile for the application to be updated (or a new profile to be used for the target application), based on the class metadata. According to an embodiment, the processor 120 may perform update file matching, based on comparison between the first class metadata and the second class metadata. According to an embodiment, before application updating is requested from a runtime, the processor 120 may compare the dex information in the current update file related to the application with the previous profile recorded (or stored) according to a user's application usage pattern and the dex information in the previous update file of the application, may maintain existing information for a method and/or class having no change, may add new information for a new method and/or class, and may perform matching between the existing information and new information. For example, the processor 120 may produce a new update file (e.g., a new installation file (e.g., new installation file (*.apk file)) related to the target application, via matching. According to an embodiment, the processor 120 may parse bytecode (e.g., dex information) from the new update file, and may produce a new profile to be actually used for compiling, based on the parsed bytecode.

In operation 417, the processor 120 may perform compiling based on the new profile. According to an embodiment, the processor 120 may request compiling from a runtime in order to update the target application, based on the new profile, and the runtime may perform compiling based on the new profile.

In operation 419, the processor 120 may determine whether a product is produced, based on a result obtained by performing compiling. According to an embodiment, the product may include a native file (or code) such as *.odex, *.vdex, or *.oat, and an initialization image associated with application class information such as *.art. According to an embodiment, the processor 120 may identify whether a *.oat file (or a native file) in which dex file is complied and *.art (or initialization image) are produced.

If it is identified that a product is not produced (e.g., fail to produce a product) (e.g., "failure" in operation 419) based on the result obtained by performing compiling, in operation 419, the processor 120 may proceed with operation 409 and may delete the temporary directory.

If it is identified that a product is produced (e.g., successfully produce a product) (e.g., "success" in operation 419) based on the result obtained by performing compiling, in operation 419, the processor 120 may proceed with operation 421 and may delete the temporary directory.

Figure 5:
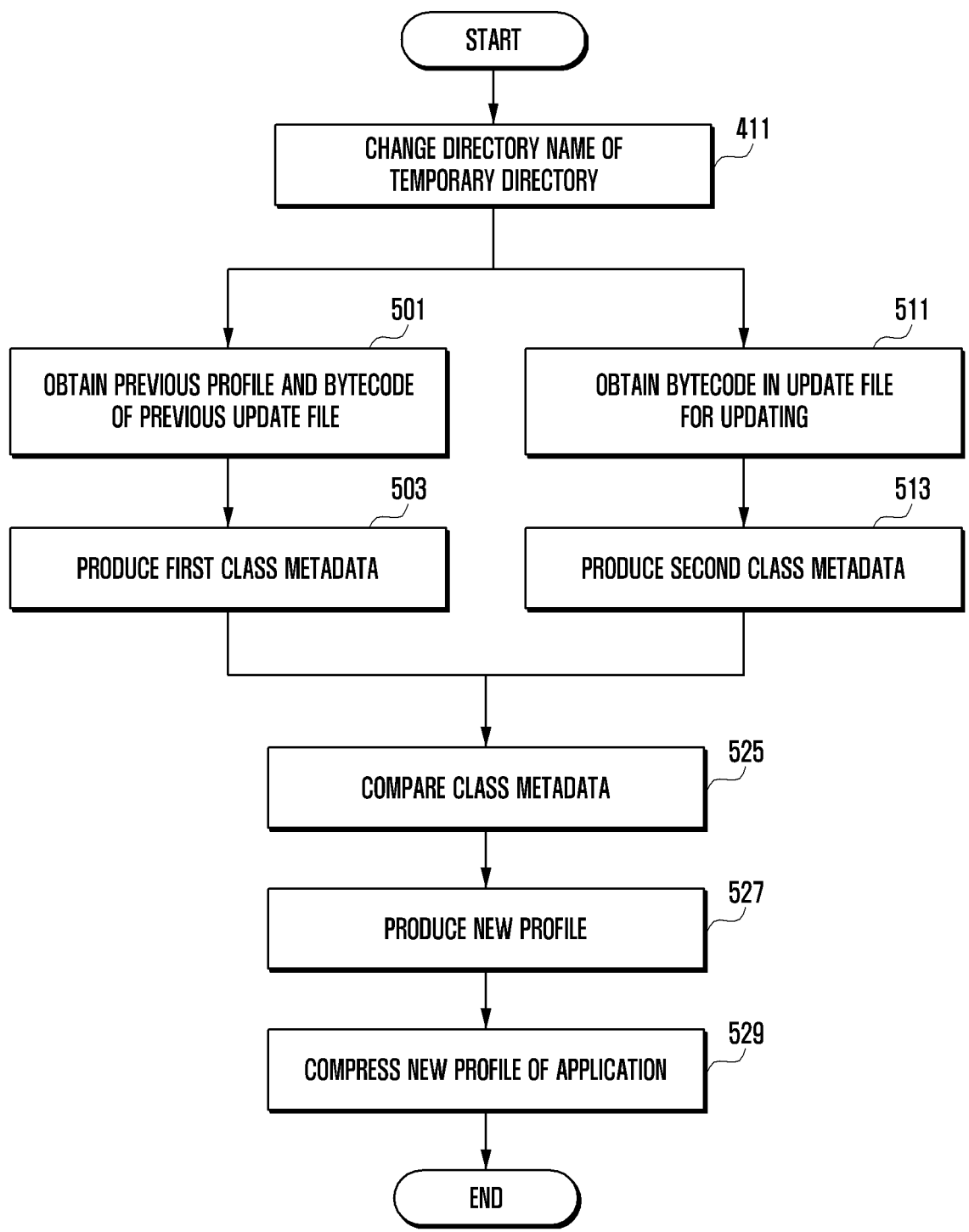
FIG. 5 is a flowchart illustrating an example method of producing a profile by an electronic device according to various embodiments.

FIG. 5 is a flowchart illustrating an example method of operating an electronic device according to various embodiments.

According to an embodiment, FIG. 5 illustrates an example of an operation of producing a new profile by the electronic device 101. For example, the embodiment illustrated in FIG. 5 may include a detailed operation related to operations 413 and 415 of the embodiment of FIG. 4.

Referring to FIG. 5, the processor 120 may change the directory name of the temporary directory in operation 411 in the embodiment of FIG. 4. According to an embodiment, the processor 120 may change the directory name set for the temporary directory to a name associated with a target application (e.g., an application name). For example, the processor 120 may produce the temporary directory as the directory of the target application.

In operation 501, the processor 120 may obtain (or parse or extract) a previous profile and a bytecode (e.g., a Java bytecode) of a previous update file. In operation 503, the processor 120 may produce first class metadata based on the previous profile and the previous update file. According to an embodiment, the processor 120 may produce the first class metadata based on the previous profile (e.g., *.prof file) and the bytecode (e.g., dex information) in the previous update file related to the application. For example, the processor 120 may produce the first class metadata using the dex information of the previous update file and the previous profile collected according to a user's usage pattern. According to an embodiment, the processor 120 may extract a frequently used hot method and codebase information of the hot method, based on the previous profile and the dex information of the previous update file, and may analyze and parse the codebase information based on a command code (e.g., opcode) and an argument object (e.g., args). According to an embodiment, the processor 120 may produce the first class metadata associated with a class used for accessing the application and a hot method, based on the parsed information. According to an embodiment, the first class metadata may be an invariant profile or invariant metadata.

In operation 511, the processor 120 may obtain (parse or extract) a bytecode (e.g., Java bytecode) in a current update file (e.g., a downloaded update file) related to the application to be updated. In operation 513, the processor 120 may produce second class metadata based on the current update file. According to an embodiment, the processor 120 may produce the second class metadata, based on the bytecode (e.g., dex information) in the current update file related to the target application. For example, the processor 120 may produce the second class metadata using the dex information of the current update file. According to an embodiment, the processor 120 may produce the second class metadata in response to the operation of producing the first class metadata. According to an embodiment, the second class metadata may be a temporary profile (e.g., temp profile) or temporary metadata (e.g., temp metadata).

According to an embodiment, operations 501, 503, 511, and 513 may be performed in parallel, sequentially, or in reverse order, in the embodiment of FIG. 5.

In operation 525, the processor 120 may compare class metadata. According to an embodiment, the processor 120 may perform update file matching by comparing the first class metadata produced based on the previous information (e.g., the previous profile and the dex information of the previous update file) and the second class metadata produced based on the current information (e.g., the dex information of the current update file). According to an embodiment, before updating of the target application is requested from a runtime, the processor 120 may compare the dex information in the current update file related to the application with the previous profile recorded (or stored) according to a user's usage pattern associated with the target application and the dex information in the previous update file of the application, may maintain existing information for a method and/or class having no change, may add new information for a new method and/or class, and may perform matching between the existing information and new information. According to an embodiment, the processor 120 may read the dex information from the previous update file, may perform parsing, and may produce the first class metadata associated with a method based on the parsed dex information. According to an embodiment, the processor 120 may read the dex information from the current update file, may perform parsing, and may produce the second class metadata associated with a method based on the parsed dex information. According to an embodiment, the processor 120 may identify an identical portion by comparing the first class metadata and the second class metadata. According to an embodiment, the processor 120 may maintain existing information for a method and a class having no change, based on the comparison between the first class metadata and the second class metadata.

In operation 527, the processor 120 may produce a new profile based on the class metadata matching. According to an embodiment, the processor 120 may produce the new profile including an identical method and class, based on the comparison between the first class metadata and the second class metadata. According to an embodiment, the processor 120 may produce the new update file (e.g., a new installation file (e.g., new *.apk file)) related to the target application, via matching, and may parse an execution file (e.g., dex information) from the new update file so as to produce a new profile to be actually used for compiling.

In operation 529, the processor 120 may compress the newly produced profile. According to an embodiment, the processor 120 may compress the new profile into a common profile (e.g., *.dm file) of the application. According to an embodiment, the common profile (e.g., *.dm file) may be compressed and called by a file name corresponding to information extracted from the electronic device 101 in relation to the corresponding application.

Figure 6:
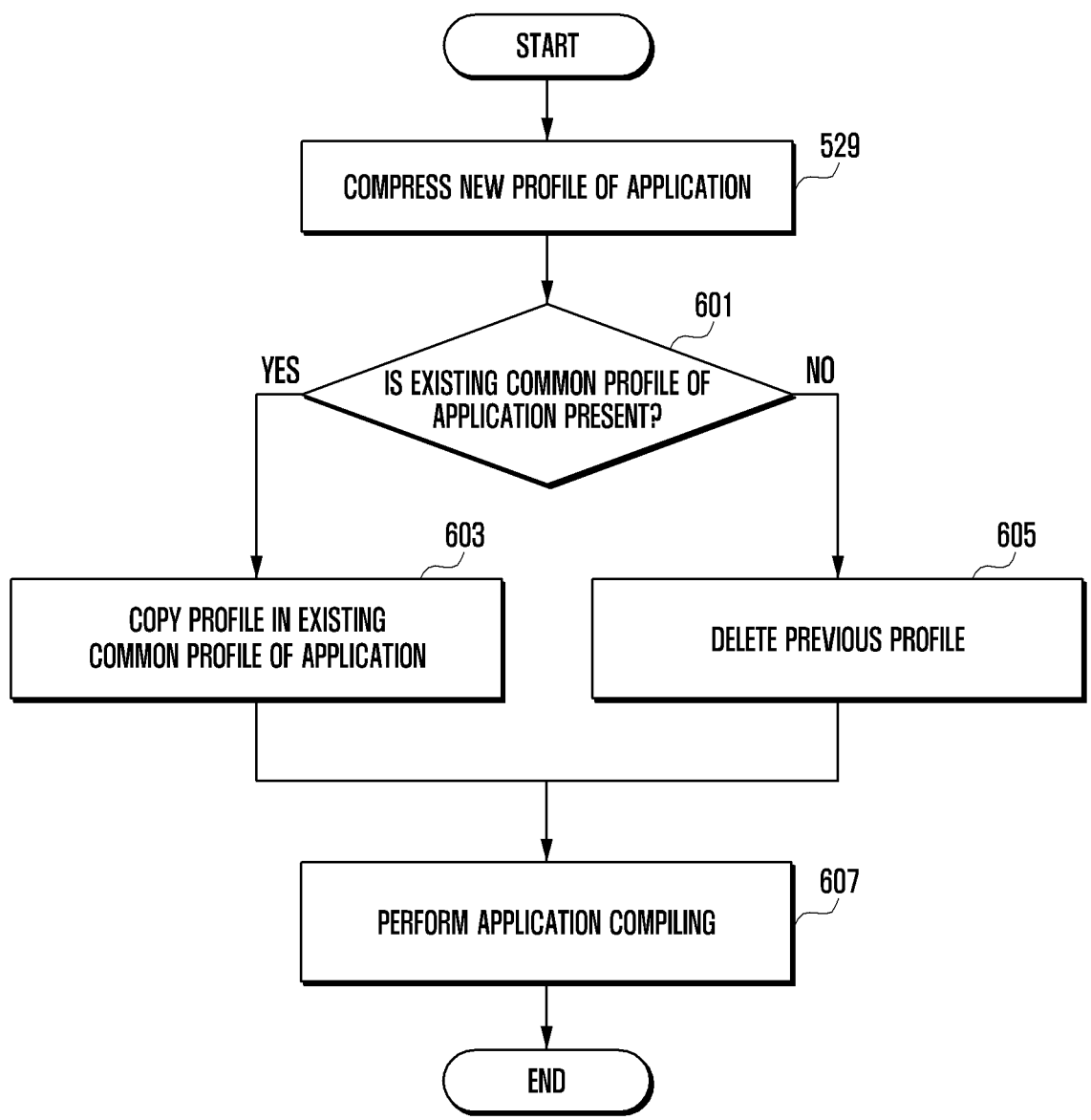
FIG. 6 is a flowchart illustrating an example method of performing compiling by an electronic device according to various embodiments.

FIG. 6 is a flowchart illustrating an example method of operating an electronic device according to various embodiments.

According to an embodiment, FIG. 6 illustrates an example of an operation of performing compiling based on a new profile by the electronic device 101. For example, the embodiment illustrated in FIG. 6 may include a detailed operation related to operation 417 of the embodiment of FIG. 4.

Referring to FIG. 6, in operation 529 in the embodiment of FIG. 5, the processor 120 may compress the new profile into a common profile (e.g., *.dm file) of the application, and may produce a compressed file.

In operation 601, the processor 120 may determine whether an existing common profile (e.g., existing *.dm file) is present in relation to the application. For example, the processor 120 may determine whether an existing common profile that has the same file name as that of the compressed new common file (e.g., new *.dm file) is present.

If the determination shows that the existing common profile (e.g., existing *.dm file) is present (e.g., "YES" in operation 601) in operation 601, the processor 120 may copy a previous profile (e.g., *.prof file) in the existing common profile in operation 603.

If the determination shows that the existing common profile (e.g., existing *.dm file) is not present (e.g., "NO" in operation 601) in operation 601, the processor 120 may delete the previous profile (e.g., *.prof file) in operation 605.

In operation 607, the processor 120 may perform compiling on the application. According to an embodiment, the processor 120 may request a runtime to perform compiling based on the new profile for the target application, and the runtime performs compiling based on the new profile. For example, the processor 120 may produce a native code (e.g., *.odex and/or *.oat) and an initialization image (e.g., *.art) associated with application class information, using a designated compiling scheme (e.g., AOT compiling) for the new profile, via the runtime. According to an embodiment, a native code, for example, may be a compiled bytecode, and may include a compiled machine code.

Figure 7:
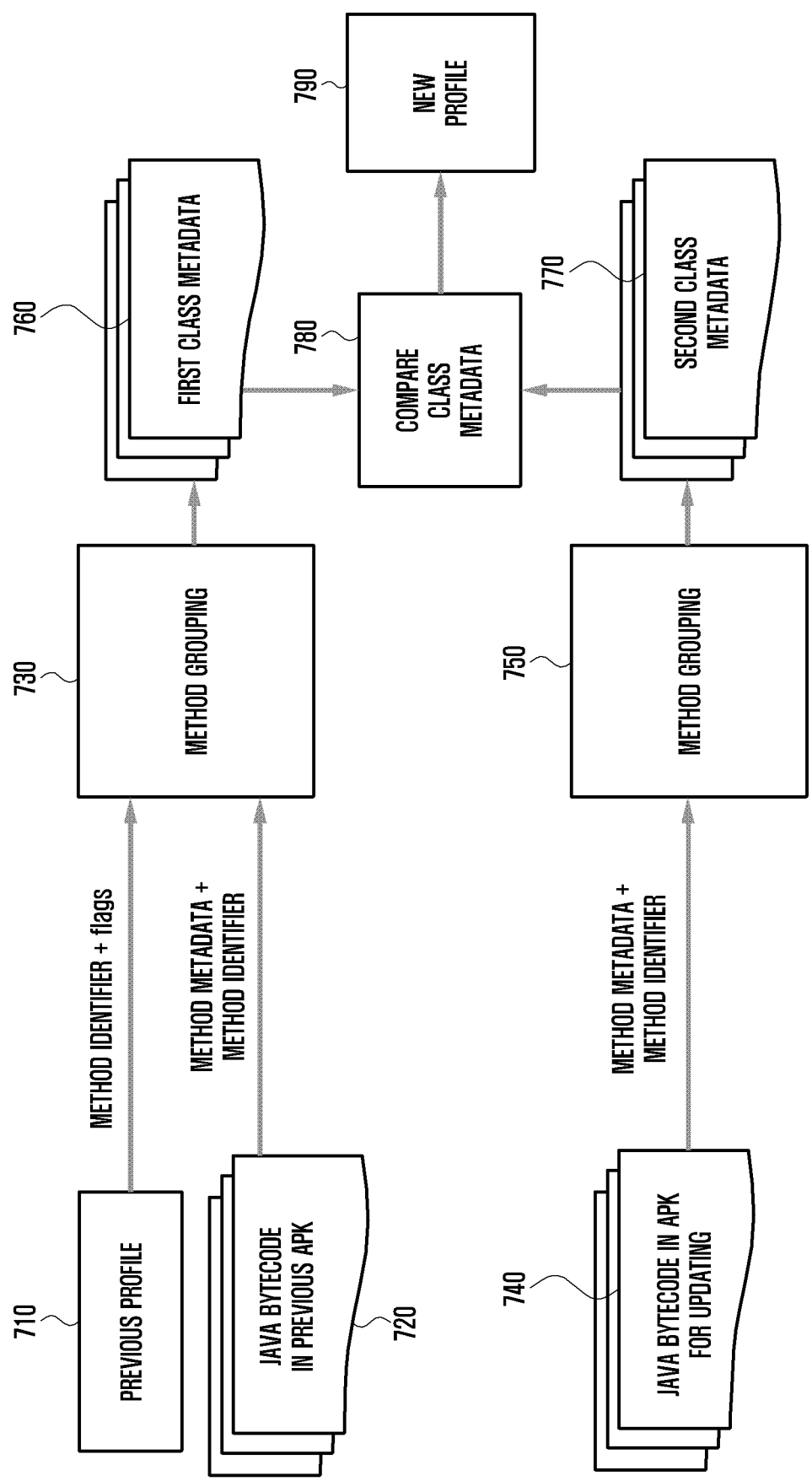
FIG. 7 is a diagram illustrating an example in which an electronic device produces a new profile based on a previous profile according to various embodiments.
Figure 8:
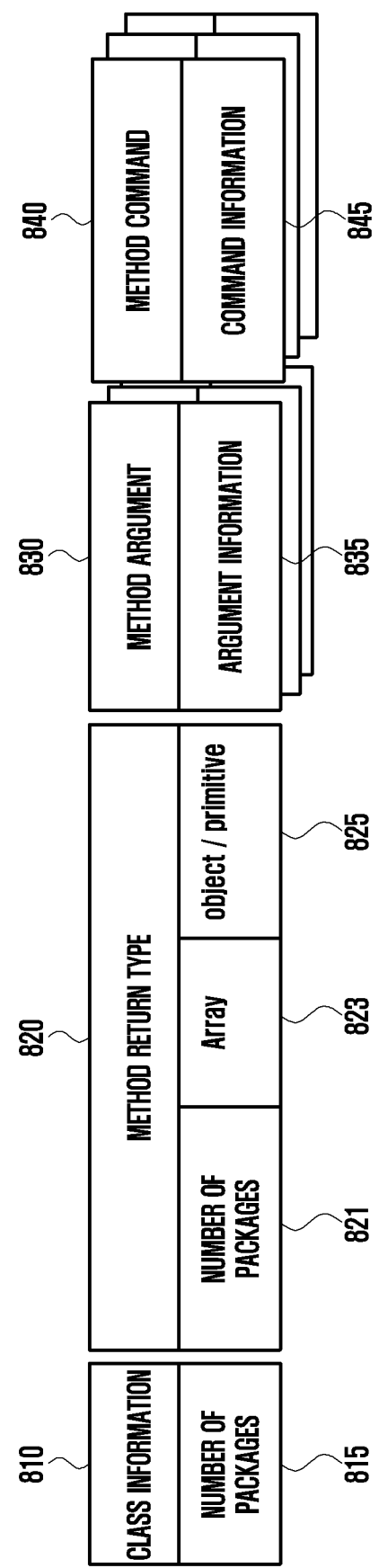
FIG. 8 is a diagram illustrating example metadata produced by an electronic device according to various embodiments.
Figure 9:
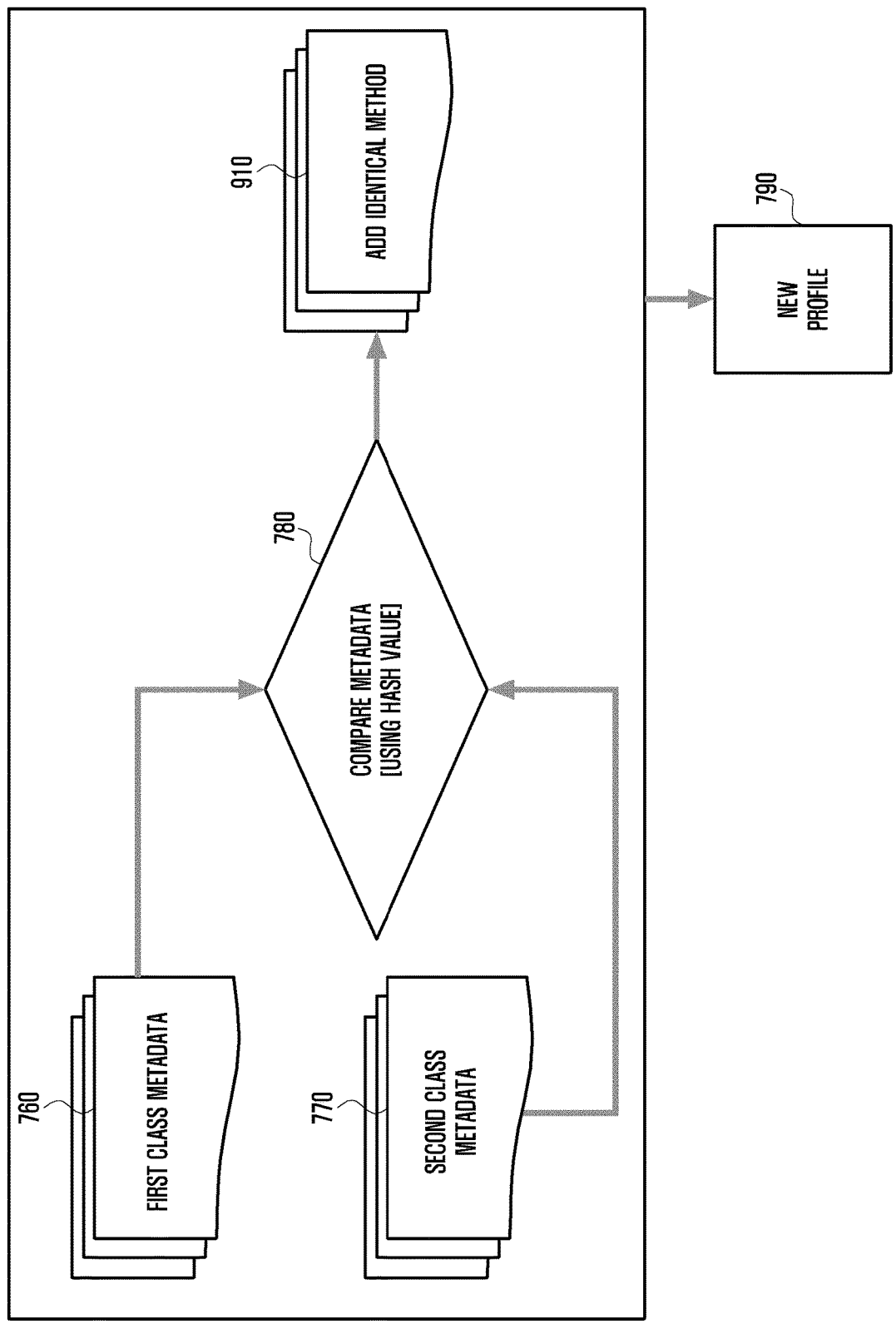
FIG. 9 is a diagram illustrating an example of performing metadata matching by an electronic device according to various embodiments.

FIG. 7 is a diagram illustrating an example of producing a new profile based on a previous profile, by an electronic device according to various embodiments. FIG. 8 is a diagram illustrating an example of metadata, produced by an electronic device according to various embodiments. FIG. 9 is a diagram illustrating an example of performing metadata matching by an electronic device according to various embodiments.

The embodiment of FIG. 7 describes an operation of producing a new profile based on a comparison between produced class metadata (e.g., first class metadata and second class metadata) as described in the embodiment of FIG. 5. For example, the electronic device 101 according to various embodiments may include a profile reuse tool for quickly reusing a profile. In the process of installing a target application when application updating is performed, the electronic device 101 may produce a new profile for the target application to be updated, based on a previous profile, using the profile reuse tool, and may transfer the new profile to a runtime. For example, if application updating (including application installation) is performed, the electronic device 101 may verify the application via a package manager (e.g., the package manager 220 of FIG. 2) (e.g., a package manager service (PacakgeManagerService) module). If the verification of the application is complete, a request for application updating may be transferred to a runtime (e.g., ART). According to various embodiments, in the process of installing the application, before application updating is requested from the runtime, the electronic device 101 may compare dex information in a current update file with a previous profile recorded according to a user pattern and dex information in a previous update file of the application, using the profile reuse tool. According to an embodiment, the runtime may compile the new profile transferred from the profile reuse tool, and may produce a native code (e.g.,*.odex and/or *.oat) and an initialization image (e.g., *.art) associated with class information of the application.

Referring to FIG. 7, the electronic device 101 may produce first class metadata 760 based on previous profile 710 of the application and a Java bytecode 720 (e.g., dex information) in a previous update file (e.g., an installation file (e.g., previous *.apk file)) of the application which the electronic device 101 contained before application updating was performed. For example, the electronic device 101 may perform method grouping 730 associated with previous information (e.g., the previous profile 710 and the Java bytecode 720 of the previous update file), based on class information that is based on a method identifier (e.g., method id) and flags related to the previous profile 710 and class information that is based on method data (e.g., a hash value) and a method identifier of the Java bytecode 720 of the previous update file. According to an embodiment, the electronic device 101 may produce first class metadata 760 based on the previous information related to the application, via method grouping 730. According to an embodiment, the first class metadata 760 may be an invariant profile or invariant metadata, which is based on the previous information.

The electronic device 101 may produce second class metadata 770 based on a Java bytecode (e.g., dex information) 740 in a current update file (e.g., current *.apk file) of the application obtained according to the application updating request. For example, the electronic device 101 may perform method grouping 750 associated with current information (e.g., the Java bytecode 740 of the current update file) based on class information based on method data (e.g., a hash value) and a method identifier of the Java bytecode 740 in the current update file. According to an embodiment, the electronic device 101 may produce the second class metadata 770 based on the current information related to the application, via method grouping 750. According to an embodiment, the second class metadata 770 may be a temporary profile (e.g., temp profile) or temporary metadata (e.g., temp metadata) which is based on the current information.

According to an embodiment, the electronic device 101 may use a hash value in order to reduce the amount of time spent on the comparison (or matching) between the first class metadata 760 and the second class metadata 770, and may use a method identifier (e.g., a class name, a return type, and/or a method name) for method grouping for each class. The structure of metadata (e.g., the first class metadata 760 and second class metadata 770) according to an embodiment may be illustrated as shown in FIG. 8.

Referring to FIG. 8, metadata may include at least one field, such as class information 810, a method return type 820, a method argument 830, and a method command 840. According to an embodiment, the class information 810 may include information associated with the number of packages of a class 815 that a method has. According to an embodiment, the method return type 820 may include the number 821 of packages of a method return type, information 823 associated with whether an array is used, and/or information associated with a type (e.g., an object type or a primitive type) 825. According to an embodiment, the method argument 830 may include argument information 835. For example, the argument information 835 may include the number of method arguments, the number of packages of an argument, information associated with whether an array is used, or information associated with an argument type (e.g., an object type or a primitive type). According to an embodiment, the method command 840 may include information associated with a command (e.g., a command code (opcode) 845 and an argument object (args)). According to an embodiment, Table 1 and Table 2 illustrate an example of a method (e.g., Table 1) and metadata associated with a method (e.g., Table 2).

TABLE 1 public class MainActivity extends Actvity
{
protected void onCreate(Bundle paramBundle)
{
super.onCreate(paramBundle);
...
}
}

TABLE 2

.class public Ltest/hals/test/myapplication/MainActivity < the number of packages of a class that a method has is 5
 .super Landroid/support/v7/app/AppCompatActivity; (not used)
 protected void onCreate(Bundle paramBundle) - .method protected onCreate(Landroid/os/Bundle;)V
{
Method return type:
V - void, the number of packages of a method return type is 1
V is not array;
V is primitive;
Method arguments:
the number of method arguments is 1
Bundle paramBundle - Landroid/os/Bundle;
the number of packages of an argument is 3
It is not array;
Argument type is object.
}

According to an embodiment, the electronic device 101 may produce a hash value based on information associated with metadata as illustrated in the embodiment of FIG. 8, via a cyclic redundancy check (CRC) (e.g., CRC-32). According to an embodiment, the electronic device 101 may use a hash value in the operation of performing metadata matching. An example thereof is illustrated in FIG. 9.

Referring to FIGS. 7 and 9, the electronic device 101 may perform comparison (or matching) 780 between the first class metadata 760 that is based on previous information (e.g., the previous profile and dex information of the previous update file) and the second class metadata 770 that is based on the current information (e.g., dex information of the current update file). According to an embodiment, the electronic device 101 may shorten the amount of time spent on class metadata comparison, using a first hash value of the first class metadata 760 and a second hash value of the second class metadata 770.

According to an embodiment, the electronic device 101 may identify an identical portion (e.g., a method) via comparison 780 between the first class metadata 760 and the second class metadata 770. For example, the electronic device 101 may identify whether methods are identical by comparing the content of the metadata. According to an embodiment, the electronic device 101 may maintain existing information for a method (e.g., an identical method 910) and class having no change, based on the comparison between the first class metadata 760 and the second class metadata 770. For example, before application updating is request from a runtime, the electronic device 101 may compare the first class metadata 760 and the second class metadata 770, may maintain existing information for a method (e.g., the identical method 910) and/or class having no change, may add new information for a new method and/or class, and may perform matching between the existing information and the new information.

According to an embodiment, the electronic device 101 may produce a new profile (e.g., new ART profile) 790 by performing matching between the first class metadata 760 and the second class metadata 770. According to an embodiment, the electronic device 101 may produce a new installation file (e.g., new*.apk file) related to the application via matching, may parse a Java bytecode (e.g., dex file) from the new installation file, and may produce the new profile 790 to be actually used for compiling.

According to an embodiment, the electronic device 101 may compile the newly produced profile 790 using a dex2oat execution file. Accordingly, without additionally using the updated application after application updating, the electronic device 101 may enable a user to immediately use the application with runtime performance that is applied according to a previous user's usage pattern.

Figure 10:
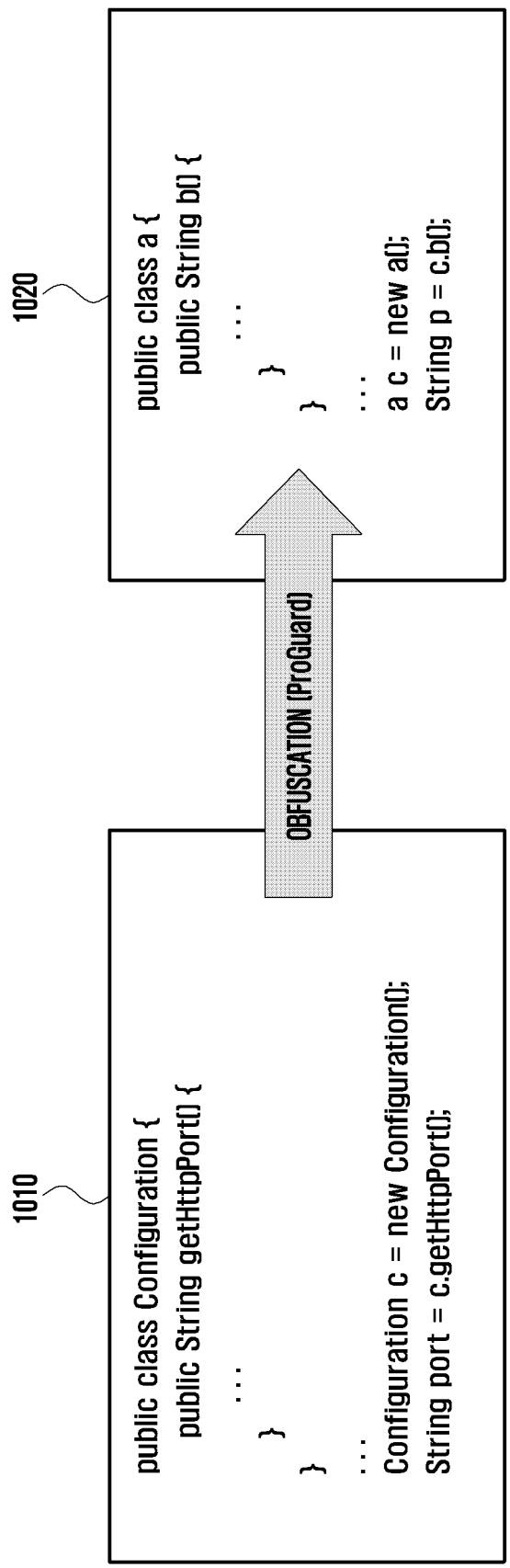
FIG. 10 is diagram illustrating an example obfuscation operation by an electronic device to produce metadata according to various embodiments.
Figure 11A:
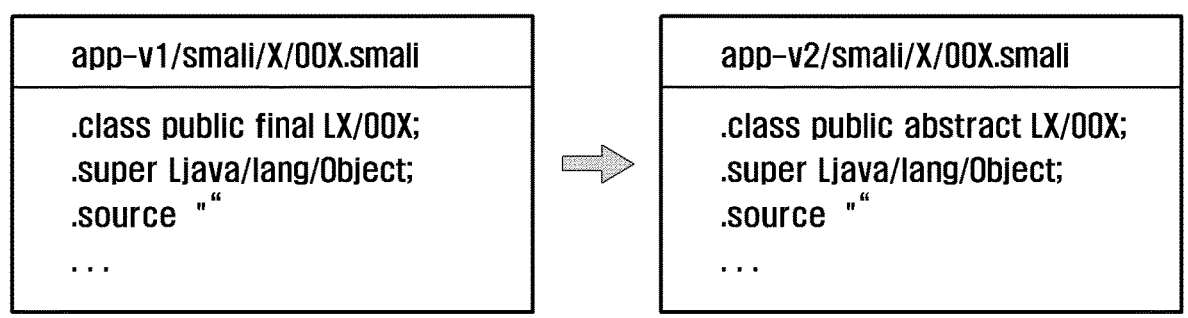
FIG. 11A is diagram illustrating an example obfuscation operation by an electronic device to produce metadata according to various embodiments.
Figure 11B:
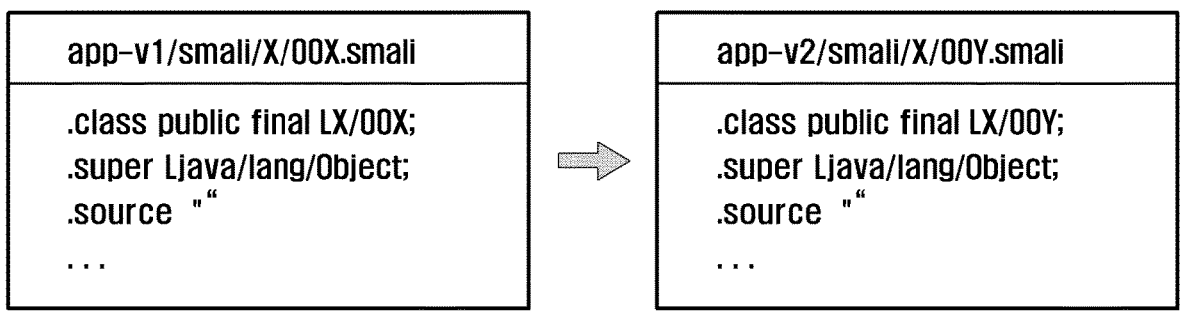
FIG. 11B is diagram illustrating an example obfuscation operation by an electronic device to produce metadata according to various embodiments.

FIG. 10 is a diagram illustrating an example obfuscation operation for producing metadata by an electronic device according to various embodiments, FIG. 11A is a diagram illustrating an example obfuscation operation for producing metadata by an electronic device according to various embodiments, and FIG. 11B is a diagram illustrating an example obfuscation operation for producing metadata by an electronic device according to various embodiments.

According to an embodiment, FIGS. 10, 11A, and 11B illustrate examples in which the electronic device 101 produces an obfuscation code for metadata. For example, the embodiments illustrated in FIGS. 10, 11A, and 11B may be examples of an obfuscation process for metadata in the embodiments illustrated in FIGS. 7, 8, and 9.

Referring to FIGS. 10, 11A, and 11B, the electronic device 101 may perform an obfuscation process via a proguard. According to an embodiment, the proguard is a tool for code obfuscation, may change the name of a parameter, method, and/or class into a short meaningless name, and may remove an unnecessary code, so as to perform optimization.

For example, as illustrated in the embodiment of FIG. 10, the name of a parameter, method, and/or class is changed via obfuscation of a source code 1010 (e.g., Java bytecode produced via Java complier), and a partial code is provided, and thus, an optimized code 1020 (e.g., a Java bytecode) may be produced. According to an embodiment, metadata as illustrated in the embodiment of FIG. 8 may be produced based on the optimized code 1020 (e.g., obfuscated bytecode) illustrated in FIG. 10.

According to an embodiment, the embodiment illustrated in FIG. 11A may illustrate an example in which a substantially different method is produced due to obfuscation, although a method name is identical (e.g., app-v1/smali/X/00X.smali). For example, ".class public final LX/00X;" may be produced as another method such as ".class public abstract LX/00X;".

According to an embodiment, the embodiment illustrated in FIG. 11B illustrates an example in which a method name is changed due to obfuscation, although the method content is identical. For example, "app-v1/smali/X/00X.smali" may be changed to "app-v2/smali/X/00Y.smali".

A method of operating and electronic device according to various example embodiments may include: detecting updating of an application; obtaining an update file for updating the application based on detecting updating of the application; obtaining first information previously recorded in association with the application and second information related to the update file of the application, while installing the application; and producing, based on matching performed between the first information and the second information, a new profile to be used in the application after the updating.

According to various example embodiments, the first information may include first metadata produced based on a previous profile recorded based on a usage pattern associated with the application and a bytecode of a previous update file of the application.

According to various example embodiments, the second information may include second metadata produced based on a bytecode of the update file obtained from an app store via the communication circuit at a point in time at which the application is updated.

According to various example embodiments, the obtaining the update file may include an operation of verifying the update file of the application.

According to various example embodiments, the performing matching between the first information and the second information may include: performing matching between the first information and the second information before updating of the application is requested from a runtime; and maintaining an identical method and an identical class based on the matching.

According to various example embodiments, the operation of performing matching between the first information and the second information may include: an operation of parsing a previous profile and a bytecode included in a previous update file in association with the first information to produce first meta data; parsing a bytecode included in the update file associated with the second information to produce second metadata; and comparing the first metadata and the second metadata.

According to various example embodiments, the first metadata and the second metadata may include at least one of class information, a method return type, a method argument, and a method command.

According to various example embodiments, the comparing may include performing a comparison based on hash values of the first metadata and the second metadata.

According to various example embodiments, the method may include performing compiling based on the new profile produced based on the matching performed between the first information and the second information.

According to various example embodiments, the method may include producing a native code and an initialization image associated with application class information based on the compiling of the new profile.

It will be understood that while the disclosure has been illustrated and described primarily with reference to the Android® operating system, the disclosure is not limited thereto, and is applicable to any operating system and/or application updating process.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic device comprising:
a communication circuit configured to perform radio communication;
at least one processor operatively connected to the communication circuit; and
a memory operatively connected to the processor,
wherein the memory stores instructions which, when executed, cause the processor to:
detect updating of an application;
obtain, from an app store via the communication circuit, an update file for updating the application based on detecting updating of the application;
obtain first information previously recorded in association with the application and second information related to the update file of the application while installing the application, wherein the first information comprises first metadata produced based on a previous profile recorded based on a usage pattern associated with the application and a bytecode of a previous update file of the application and the second information comprises second metadata produced based on a bytecode of the update file obtained from the app store via the communication circuit at a point in time at which the application is updated; and
produce, based on matching performed between the first metadata in the first information and the second metadata in the second information, a new profile to be used in the application after the updating.

2. The electronic device of claim 1, wherein the second metadata is obtained in response to producing the first metadata.

3. The electronic device of claim 1, wherein the instructions, when executed, cause the processor to: verify the update file of the application.

4. The electronic device of claim 1, wherein the instructions, when executed, cause the processor to perform matching between the first information and the second information before updating of the application is requested from a runtime, and to maintain an identical method and an identical class based on the matching.

5. The electronic device of claim 4, wherein the instructions, when executed, cause the processor to:
parse the previous profile and the bytecode included in a previous update file in association the first information to produce the first metadata;
parse the bytecode included in the update file associated with the second information to produce the second metadata; and
compare the first metadata and the second metadata.

6. The electronic device of claim 5, wherein the first metadata and the second metadata comprise at least one of class information, a method return type, a method argument, and a method command.

7. The electronic device of claim 5, wherein the instructions, when executed, cause the processor to perform the comparison based on hash values of the first metadata and the second metadata.

8. The electronic device of claim 1, wherein the instructions, when executed, cause the processor to perform compiling based on the new profile produced based on matching performed between the first information and the second information.

9. The electronic device of claim 8, wherein the instructions, when executed, cause the processor to produce a native code and an initialization image associated with application class information based on the compiling of the new profile.

10. A method of operating an electronicdevice, the method comprising: detecting updating of an application; obtaining, from an app store using a communication circuit of the electronicdevice, an update file for updating the application based on detecting updating of the application; obtainingfirst information previously recorded in association with the application and second information related to the update file of the application while installingthe application, wherein the first information comprisesfirst metadata produced based on a previous profile recorded based on a usage pattern associated with the application and a bytecode of a previous update file of the application and the second information comprises second metadata produced based on a bytecode of the update file obtained from the app store via the communication circuit at a point in time at which the application is updated; and producing, based on matching performed between the first metadata in the first information and the second metadata in the second information, a new profile to be used in the application after the updating.

11. The method of claim 10, wherein the second metadata is obtained in response to producing the first metadata.

12. The method of claim 10, wherein the obtaining the update file comprises:
verifying the update file of the application.

13. The method of claim 10, wherein the matching performed between the first information and the second information comprises:
performing matching between the first information and the second information before updating of the application is requested from a runtime; and
maintaining an identical method and an identical class based on the matching.

14. The method of claim 13, wherein the performing of matching between the first information and the second information comprises:
parsing the previous profile and the bytecode included in a previous update file in association with the first information to produce the first metadata;
parsing the bytecode included in the update file associated with the second information to produce the second metadata; and
comparing the first metadata and the second metadata.

15. The method of claim 14, wherein the first metadata and the second metadata comprise at least one of class information, a method return type, a method argument, and a method command.

16. The method of claim 14, wherein the comparing comprises:
performing comparison based on hash values of the first metadata and the second metadata.

17. The method of claim 10, further comprising:
performing compiling based on the new profile produced based on the matching performed between the first information and the second information.

18. The method of claim 17, further comprising:
producing a native code and an initialization image associated with application class information, based on the compiling of the new profile.

* * * * *